United States Patent [19]
Yacoby

[11] Patent Number: 5,214,646
[45] Date of Patent: May 25, 1993

[54] SYSTEM AND METHOD FOR INTERCONNECTING LOCAL AREA NETWORKS

[76] Inventor: Amnon Yacoby, Maccabim, 342, Doar Na Modiim, Israel, 71098

[21] Appl. No.: 791,442

[22] Filed: Nov. 13, 1991

Related U.S. Application Data

[63] Continuation of Ser. No. 472,904, Jan. 31, 1990, Pat. No. 5,088,090.

[51] Int. Cl.⁵ .............................................. H04J 3/24
[52] U.S. Cl. ........................... 370/85.140; 370/85.13
[58] Field of Search ............... 370/85.13, 85.14, 85.15, 370/94.3, 94.1, 60; 340/825.5, 825.51, 825.02

[56] References Cited

U.S. PATENT DOCUMENTS

| | | | |
|---|---|---|---|
| 4,621,362 | 11/1986 | Sy | 370/94.1 |
| 4,809,265 | 2/1989 | Hart et al. | 340/825.5 |
| 4,897,841 | 1/1990 | Gang, Jr. | 370/85.15 |
| 4,975,906 | 12/1990 | Takiyasu et al. | 370/85.13 |
| 5,060,228 | 10/1991 | Tsutsui et al. | 370/85.13 |
| 5,086,426 | 2/1992 | Tsukakoshi et al. | 370/85.13 |
| 5,088,090 | 2/1992 | Yacoby | 370/85.14 |
| 5,088,091 | 2/1992 | Schroeder et al. | 370/85.13 |

*Primary Examiner*—Douglas W. Olms
*Assistant Examiner*—Dang Ton

[57] ABSTRACT

A transmission system transmits data among interconnected local area networks using a bridge coupled between local area networks which senses whether the data originating node transmitted the data using transparent routing or source routing. The bridges provide interconnection at the MAC-layer and based upon information contained in the MAC-layer header, automatically perform either transparent routing or source routing, depending upon the type of routing used by the data originating node. In addition, the bridge provides source routing over multiple wide area channels to those nodes which use source routing.

5 Claims, 4 Drawing Sheets

SYSTEM AND METHOD FOR INTERCONNECTING LOCAL AREA NETWORKS

This is a continuation of Ser. No. 472,904 filed Jan. 31, 1990 now U.S. Pat. No. 5,088,090.

BACKGROUND OF THE INVENTION

The present invention relates to a data transmission system for transmission of order characters, address-characters, control characters and information characters between nodes that reside in local area networks (LANs). Data transmission over LANs is done according to well defined and internationally accepted access protocol standards. The present invention is related mainly (but is not limited) to the following LAN access protocols: Token Ring protocol (also known as IEEE 802.5), and Ethernet IEEE 802.3.

All nodes that reside on one LAN share its common access protocol. Data transmission is done according to the following procedure: (1) any node that needs to send data is coupled to the transmission media that is common to all the nodes, according to the LAN access protocol; (2) once the node transmits the data, the data is sent over the transmission media, and all the connected nodes can read the transmitted data; (3) the data is sent as datagrams (packets of data), and the header of each datagram contains address characters that indicate the destination node (or nodes, if it is to be a broadcast or multicast datagram), and the source transmitting node. Even though all the connected nodes may read the datagram, only the addressed node or nodes will access the datagram.

There are two principal connection methods to interconnect two or more LANs. The first uses MAC layer interconnection and interconnection devices that use this method are called bridges and brouters. The principle of forwarding datagrams from one LAN to another is based on the address characters in the header of each datagram. These devices are called MAC-layer bridges or brouters because their filtering, forwarding and routing are based on the address and control characters that are part of the MAC (Media Access Control) sublayer, as defined by international standards. Bridges and brouters filter all datagrams that are transmitted over the LAN they are connected to. They forward to other LANs only those datagrams whose MAC destination address belongs to a LAN other than the LAN to which they are connected. While forwarding datagrams from one LAN to another, the address characters and information characters of the datagram are unchanged. Bridges differ from brouters in that brouters have the additional capabilities of limited routing over the interconnected-LAN network and additional filtering by various criteria like protocol type, message ID, etc.

The second principal connection method is network layer interconnection. The interconnection devices that use this method are called routers. Their principle of forwarding datagrams from one LAN to another is based on the networking and routing information that is present at the header of the network layer part of the datagram. The network layer is defined by international and industry standards and contains address, network, routing and control characters according to specific network layer protocol, such as (but not limited to) IP, DECNET—Network protocol, IPX, XNS. Routers forward and route to other LANs only those datagrams that are requesting to be transmitted to other LANs. The request is inserted within the network layer header of the datagram. While forwarding and routing datagrams from one LAN to another, the router might change or modify headers of the datagram within the MAC layer and network layer.

The present invention relates only to the first method, namely, MAC-layer interconnection.

MAC-layer interconnection has one main disadvantage, which is the limited capability of routing, because all decisions are based only on MAC layer information. Thus, two methods have been developed in an attempt to overcome this disadvantage. In the first, known as transparent routing, a bridge or brouter forwards a datagram to another LAN using look up tables in order to calculate the direction of the destination address. In this method, the transmitting node does not participate in the process and is ignorant of the fact that its datagram is being routed over other LANs and/or channels into another LAN. There are several routing methods that can be used to implement transparent routing, such as: the spanning tree protocol that can handle active loop topologies; distribute load sharing protocols that can handle active loop traffic; and simple forwarding algorithms that do not allow loop topologies.

The second routing method is source routing, in which a bridge or brouter looks at the source routing field of the datagram. If it is a source route datagram, it is transmitted to other LANs using the path through itself and other LANs indicated by data within a special field of the datagram. If it is an information datagram with a routing path decided by the source node, it will forward and route the datagram according to the route path directions written within that routing field.

One disadvantage of using these two routing methods is that they differ significantly one from the other. Because of that, bridges and brouters have heretofore been designed to use only one of the routing methods, not both. Thus, nodes that use source routing methods are not given the proper routing service by bridges/brouters that use the transparent routing method and vice versa. This problem is particularly serious whenever some nodes on a LAN use source routing and some nodes on the same LAN use transparent routing.

Another disadvantage which arises with the source routing method is that it cannot connect remote LANs with multiple links, since this method defines only connections of the type: bridge/brouter—LAN—bridge/brouter, which are unique. If there is only one link between two remote LANs, then the combination bridge/brouter—link—bridge/brouter is also unique and it can be used with the regular source routing method. On the other hand, if between two bridge/brouters there is more than one connecting link or path, then the source routing method needs some method to define uniquely each possible combination of bridge/brouter—link—bridge/brouter.

SUMMARY OF THE INVENTION

The object of the present invention is to provide a complete routing solution, systemwide, not dependent on the routing scheme used or not used by any node in the system. Any node on any interconnected LAN may use the source routing method or the transparent routing method.

The object of the present invention is substantially realized by incorporating within the bridging device (the device that is based on MAC layer filtering and forwarding) source routing and transparent routing in such a way that the routing service is provided equally and automatically to any node connected to a LAN, to which a bridging device that uses the present invention is also connected, regardless of the routing type that this node requires.

One feature of the present invention is that two or more LANs are connected by bridges or brouters at the MAC layer, as defined by the IEEE 802 standard, that selectively perform one of two routing methods: (a) transparent routing, as defined by IEEE 802.3, which means that interconnection of nodes residing on different networks is done transparently to the nodes, without their involvement in the process and without their knowledge about its occurrence, by a bridge/brouter device; and (b) source routing, as defined by IEEE 802.5, which means that the routing path decision is determined by the source node with the help and participation of the bridge/brouter in the process of finding the possible paths. It is understood by those skilled in the art that at the present time, the source routing scheme included within the IEEE 802.5 standard is still in draft status. Thus, the source routing scheme should be referred to as IEEE 802.5 (Chapter X—draft). However, for simplicity, the draft status of this standard will not be referred to herein.

According to the invention, any one of the LANs interconnected by a device that uses the present invention, may have nodes using the source routing method as defined by IEEE 802.5 and nodes which use transparent routing, as defined by IEEE 802.3. A device in accordance with the present invention recognizes which type of routing should be used and automatically provides the routing service, i.e., transparent or source routing, to any node, depending on the routing method used by that node. The traffic of a node that uses the source routing method is source routed by the devices using the present invention to its destination LAN. The traffic of a node that does not use the source routing method is transparent routed by the devices using the present invention to its destination LAN. According to the invention, there is automatic support of the two routing schemes within the same MAC-layer device, and each routing method is independently pursued over the entire path of the traffic. In addition, the present invention allows the use of the source routing method over multiple remote links between remote LANs interconnected by devices using the present invention.

According to the present invention, whenever a transmitting node that is connected to a LAN, to which a bridging device that uses the present invention is connected, sends a packet over the LAN toward a destination address that is located outside of this LAN, the bridging device forwards and routes the message according to the routing scheme used by the transmitting node. If the transmitting node uses the source routing method, then the bridging device will use the source routing technique as defined by IEEE 802.5, in order to ensure proper searching and use of the right path to the right destination. If the transmitting node is not using the source routing method, then the node requires a transparent routing service, which means that the bridging device uses its updated tables of addresses and other information of the network topology to send the data traffic over a valid path to its final destination or to another LAN, on which another bridging device will be responsible to continue the forwarding and routing.

The procedure of routing according to the present invention by the bridging device is transparent to higher layers of the communications protocols, as defined by the Open System Interconnection (OSI) standards. Thus, the network layer (3rd layer) and higher layers of the protocols used over the LANs are not involved in the routing procedures and routines.

A bridging device that uses the present invention identifies within each packet of data transmitted over the LAN the usage of the source routing field. It then decides which routing service to provide to this packet, namely, source routing or transparent routing. When using source routing between remote sites with multiple links, any combination of the bridge/brouter—link—bridge/brouter is equivalent to the combination bridge/brouter—LAN—bridge/brouter. In this way, adding serial links is similar to adding serial LANs (logically) and there is no ambiguity while using any path between bridges/brouters. Using this procedure, there is an insertion of a "dummy" LAN between bridges/brouters. The dummy LAN number is composed of the link number of each bridge/brouter at each side, so that the combination bridge/brouter number—dummy LAN number—bridge/brouter number is unique for any possible combination within the network.

BRIEF DESCRIPTION OF THE DRAWINGS

The invention will now be described in more detail with reference to the accompanying drawings in which.

DETAILED DESCRIPTION OF THE PREFERRED EMBODIMENT

Figures 1, 2:
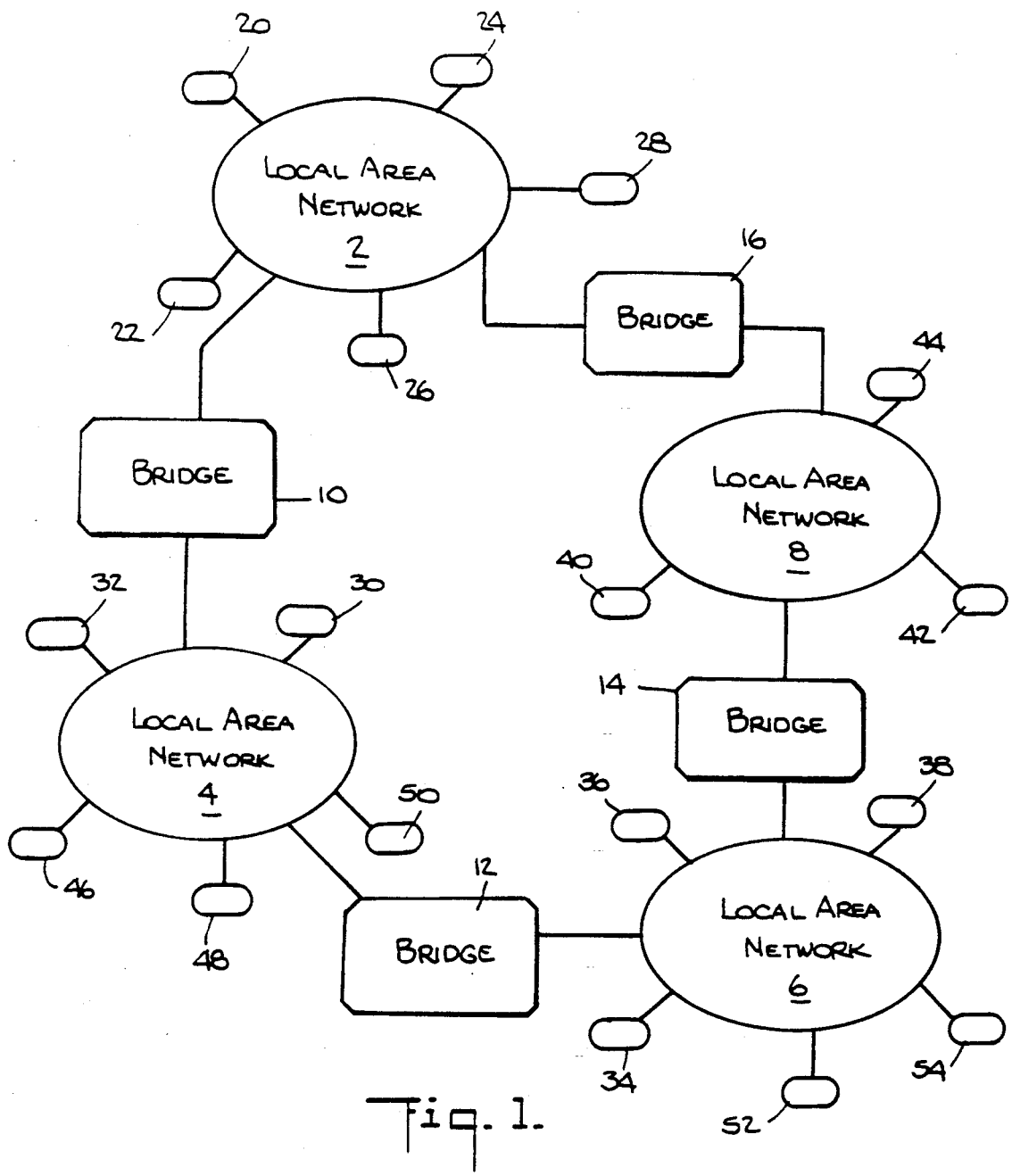
FIG. 1 shows a block diagram illustrating a typical LAN interconnection application using the present invention.
FIG. 2 is a representation of the data in the MAC-layer header.

According to the invention, a plurality of nodes are connected to several LANs. The LANs are interconnected by bridging devices. There are two basic configurations: FIG. 1 describes interconnection of LANs in the same site by local bridging devices; and FIG. 4 describes interconnection of LANs in remote sites by remote bridging devices.

Referring to FIG. 1, four LANs 2, 4, 6 and 8 are shown interconnected by bridging devices 10, 12, 14 and 16. Each bridging device is connection to two LANs, i.e., bridge 10 is connected to LAN 2 and LAN 4; bridge 12 is connected to LAN 4 and LAN 6; bridge 14 is connected to LAN 6 and LAN 8; and bridge 16 is connection to LAN 8 and LAN 2.

Several nodes are connected on each LAN. The nodes that are connected are divided into two types: source routing nodes and non source (or transparent) routing nodes. For example, nodes 20, 22, 24 connected to LAN 2 are transparent routing type and nodes 26, 28 connected to LAN 2 are source routing nodes. Similarly, nodes 30, 32 connected to LAN 4, nodes 34, 36, 38 connected to LAN 6, and nodes 40, 42, 44 connected to LAN 8 are source routing nodes. Nodes 46, 48, 50 connected to LAN 4 and nodes 52, 54 connected to LAN 6 are non source (or transparent) routing nodes.

Whenever a source routing node, for example, node 26, sends a message to another source routing node on another LAN, for example, node 34, the bridging devices handle this message with the source routing standard protocol. FIG. 2 shows the data in the MAC-layer header. Using the source routing field within the frames of the message, bridge 16 and bridge 14, respectively, will check for their own numbers and the appropriate LAN numbers in the routing field of the packet and will send the packet according to the source routing field information as defined in IEEE 802.5. Alternatively, if it is searching for a route packet, all bridging devices, namely, 10, 12, 14 and 16, will add their own numbers and relevant LAN numbers to the routing field of the packet, according to the IEEE 802.5 and send it in an appropriate direction according to the above standard.

On the other hand, if a non-source routing node, for example, node 46, is sending a message to another non-source routing node, for example, node 54, then the bridging devices handle this message transparently, namely, the bridging devices use their self-learned lookup tables and databases to determine whether the destination node belongs to another LAN. If it does belong to another LAN, different from the LAN of the source node 46, then bridge 12 or bridge 10 will handle the message and will send it toward its destination LAN. The procedure of transparent routing may be according to the spanning tree protocol (STP) as defined by the IEEE 802.1 (D) (draft standard) or by other transparent protocols used by transparent bridges or brouters.

According to the invention, the bridging device performs an identification test on each packet; if the information is transmitted from a source routing node, then the bridge applies the source routing bridging protocol. If it is not transmitted from a source routing node, then the bridge applies a transparent bridging protocol. The identification is done by examining the routing field and source routing bit within the MAC-layer field.

FIG. 2 is a representation of the MAC-layer header which accompanies each packet of data. As indicated, the MAC-layer header includes an access control (AC) byte of information, a frame control (FC) byte of information 6 bytes of information representing the destination address for the packet of information and 6 bytes of information representing the source address, that is, the address of the originating or transmitting node. The arrangement of the various bits of information within the MAC-layer header has been standardized and well known to those in the art. Within the 6 bytes of information representing the source address is one bit of information known as source routing identifier (RI). This is the first and most significant bit of the source address field within the MAC-layer header. If the source routing identifier is a logical 1, then the packet of information has a source routing field and uses the source routing method. On the other hand, if the source routing identifier is a logical 0, then there is no source routing field in the packet and transparent routing is applied to the packet of information. In accordance with the invention, the source routing identifier is detected in the bridge and the bridge is automatically adjusted to apply either source routing or transparent routing to the packet of information to which the header is attached so that each packet of information is routed in accordance with its appropriate routing method. This is accomplished on a packet-by-packet basis.

Figure 3:
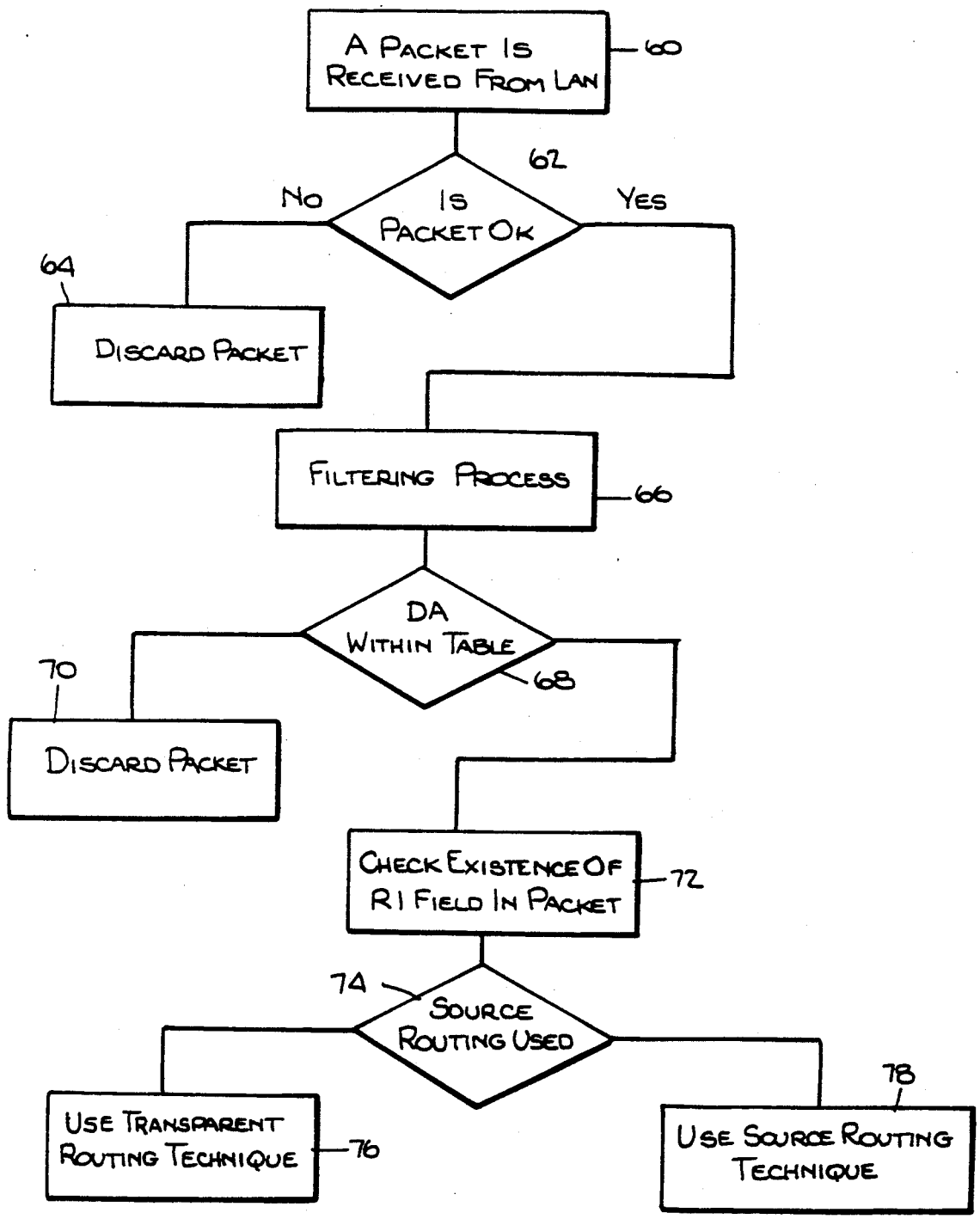
FIG. 3 is a flow chart illustrating the operation of the invention.

The invention is further described and will be understood by reference to FIG. 3, which is a block diagram representing the processing of each packet of information. Referring to FIG. 3, the bridge receives a single packet of information from a LAN, as represented by block 60. Next, the packet of information is checked to ensure that it does not contain errors, block 62. If errors are detected, the packet is discarded, block 64. If the packet of information is correct, it is put into a filtering process to check its destination address within the MAC-layer against the LAN table of the addresses of the LAN nodes, block 66. If the destination address (DA) is within the LAN table, then the packet of information has arrived at the destination LAN, block 68, and the packet is discarded, block 70. On the other hand, if the packet destination is not within the LAN, it has to be forwarded. To this end, the existence of the source routing identifier (RI) within the packet is checked, block 72. If the source routing identifier does not exist, that indicates that source routing is not used by the packet, block 74, and transparent routing is then applied to the packet, block 76. On the other hand, if the source routing identifier does exist, source routing is used, block 78. In this manner, source routing or transparent routing is applied to a particular packet automatically, dependent upon a determination made by sensing information in the MAC-layer header.

Figure 4:
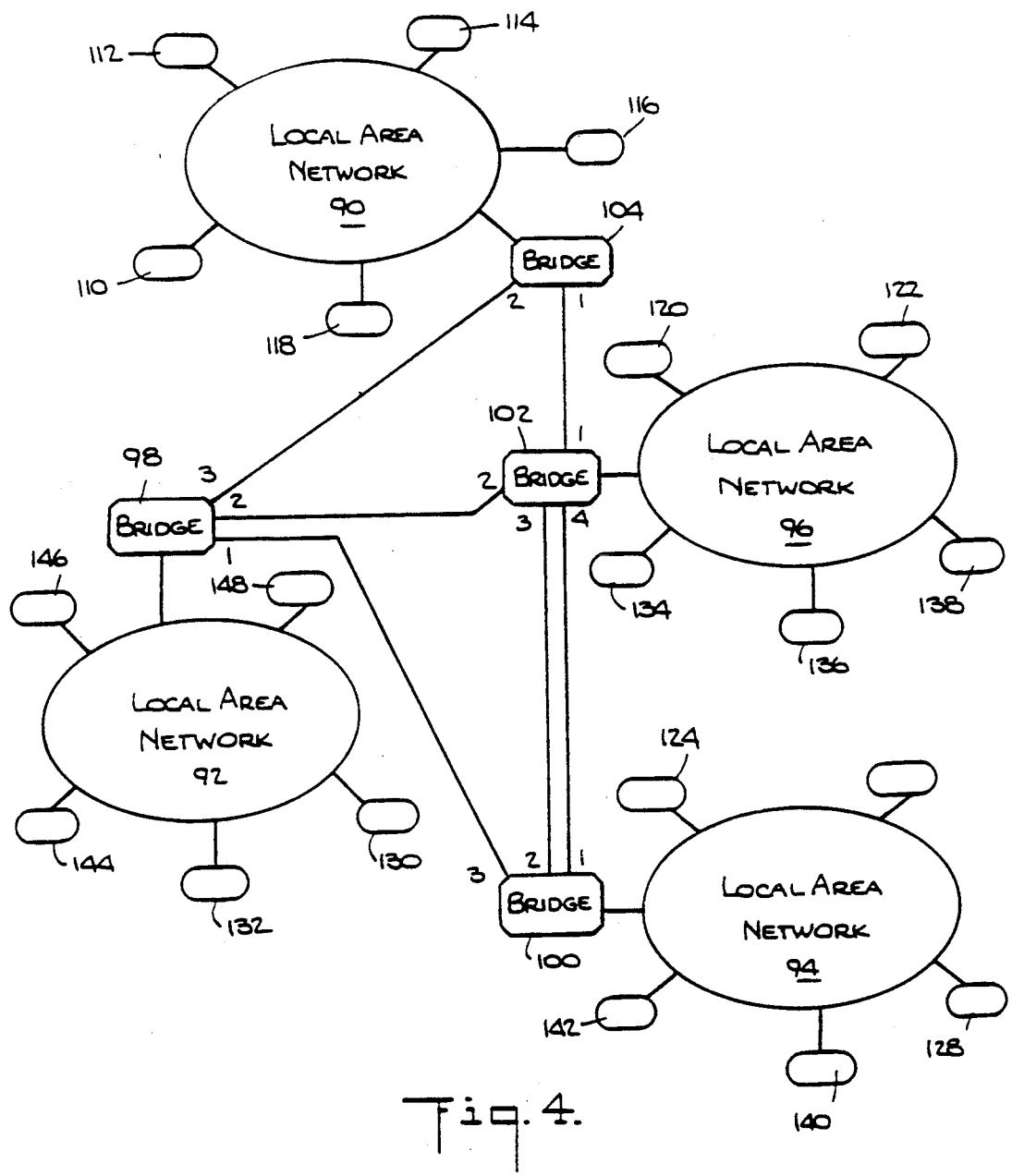
FIG. 4 is a block diagram illustrating an example of remote LAN interconnection with multiple links using the present invention.

FIG. 4 illustrates another embodiment of the invention in which remote LANs are interconnected via multiple links. Referring to FIG. 4, four LANs 90, 92, 94, and 96 are interconnected by bridges 98, 100, 102 and 104. Each bridging device is connected to only one LAN, i.e., bridge 98 is connected to LAN 92, bridge 100 is connected to LAN 94, bridge 102 is connected to LAN 96, and bridge 104 is connected to LAN 90. The bridges are also interconnected between themselves in the following way: bridge 104 link 1 is connected to bridge 102 link 1; bridge 104 link 2 is connected to bridge 98 link 3; bridge 102 link 2 is connected to bridge 98 link 2; bridge 102 links 3 and 4 are connected via two parallel links to bridge 100, links 2 and 1, respectively; and bridge 100 link 3 is connected to bridge 98 link 1.

Several nodes are connected on each LAN. The nodes that are connected are divided into two types: source routing nodes and non-source (or transparent) routing nodes. Nodes 110, 112, connected to LAN 90, are transparent routing nodes. Nodes 114, 116, 118 connected to LAN 90 are source routing nodes. Similarly, nodes 120, 122, connected to LAN 96, nodes 124, 126, 128, connected to LAN 94, and nodes 130, 132, connected to LAN 92, are source routing nodes. Nodes 134, 136 and 138, connected to LAN 96, nodes 140, 142, connected to LAN 94, and nodes 144, 146, 148, connected to LAN 92, are non-source (or transparent) routing nodes.

Whenever a source routing node, for example, node 114, sends a message to another source routing node on another LAN, for example, node 124, the bridging devices handle this message with the source routing standard protocol. Using the source routing field within the frames of the message, bridge 104 checks for its own number and the appropriate LAN number in the routing field of the packet and sends the packet according to the source routing field information as defined in IEEE 802.5. Alternatively, if it is searching for a route packet, all bridging devices, 104, 102, 100 and 98, will add their own numbers and relevant LAN numbers to the routing field of the packet, according to IEEE 802.5, and send it in appropriate directions according to the above standard. While sending the packets between bridges over the bridge-to bridge media, the combination bridge link channel-bridge will be treated as a bridge ring-bridge according to IEEE 802.5, as explained in more detail below.

On the other hand, if a non-source routing node, for example, node 144, sends a message to another non-source routing node, for example, node 134, then the bridging devices handle this message transparently, namely: the bridging devices use their self learned look up tables and databases to determine whether the destination node belongs to another LAN. If it does belong to another LAN, different from the LAN of the transmitting node 144 (LAN 92), then bridge 98 will handle the message and will send it toward its destination LAN. The procedure for transparent routing may be according to the spanning tree protocol (STP) as defined by the IEEE 802.1 (d) (draft standard) or by other conventional transparent protocols used by transparent bridges or brouters.

The bridging device performs an identification test for each packet: if the packet was transmitted from a source routing node, then the bridge applies the source routing bridging protocol to it; if it was not transmitted from a source routing node, then the bridge applies a transparent bridging routing to it. The identification within each packet is done by examining the routing field and source routing bit within the MAC layer header.

When using source routing with bridging devices interconnecting remote LANs, the following method is performed according to the present invention. Ordinarily, a bridging device using the source routing method operates as if the system is arranged as follows: LAN—bridging device—LAN—bridging device—LAN. According to the source routing method, for each combination LAN—bridging device, there are two bytes (16 bits) within the routing field, 12 bits for the LAN number, 4 bits for the bridging device number. According to the present invention, a bridging device will provide a sequence of bits representing the combination bridging device—link—bridging device in accordance with the source routing method so that it will look as if it represents a combination: bridging device—LAN—bridging device. The bridging device will provide different sequences of bits to any combination of bridging devices and links to keep the uniqueness required by the source routing method of each possible path.

Applying this system to the network system illustrated in FIG. 4, a source routing node, for example, node 128, sends a packet to another source routing node, for example, node 120. There are four possible paths, each of which has a different source routing path field:

Path #1 : LAN94-bridge100/link1-link4/bridge102-LAN96
Path #2 : LAN94-bridge100/link2-link3/bridge102-LAN96
Path #3 : LAN94-bridge100//link3-link1/bridge98-/link2-link2/bridge 102 LAN 96
Path #4 : LAN94-bridge100/link3-link1/bridge98-/link3-link2/bridge 104/link1-link1/bridge102-LAN96

According to the present invention, these four paths are inserted by the bridging devices into the routing field of the data packet of node 128, as follows:

Path #1 :
LAN94-bridge(*)(100modulu26)-LAN(**)-bridge(*)(102modulu16)
Path #2 :
LAN94-bridge(*)(100modulu16)-LAN(**)-bridge(*)(102modulu16)
Path #3 : LAN94-bridge(*)(100modulu16)-LAN(**)bridge(*)(48modulu16)-LAN(**)-bridge(*)(102modulu16)
Path #4 :
LAN94-bridge(*)(100modulu16)-LAN(**)-bridge(*)(98modulu16)-LAN(**)-bridge(*)(104modulu16)-LAN(**)-bridge(*)(102modulu16)

In creating these routing fields, since each bridge is identified by only 4 bits in accordance with the source routing definition, (IEEE 802.5), the bridge number, represented by (*), is the bridge number represented in modulu16. The LAN number (**) is created by the combination of link numbers. There are many schemes that will create a LAN number that is unique and not repeatable elsewhere in the network. In this example, the method of creating the LAN number is as follows: the first two bits of the 12 bits creating the LAN number are 11. The next two bits are MSB (Most Significant Bits) of the first bridge, the next two bits are the MSB of the second bridge on the other side of the link, the next 3 bits are the link number of the first bridge, and the last 3 bits are the link number of the second bridge on the other side of the link.

Figure 5:
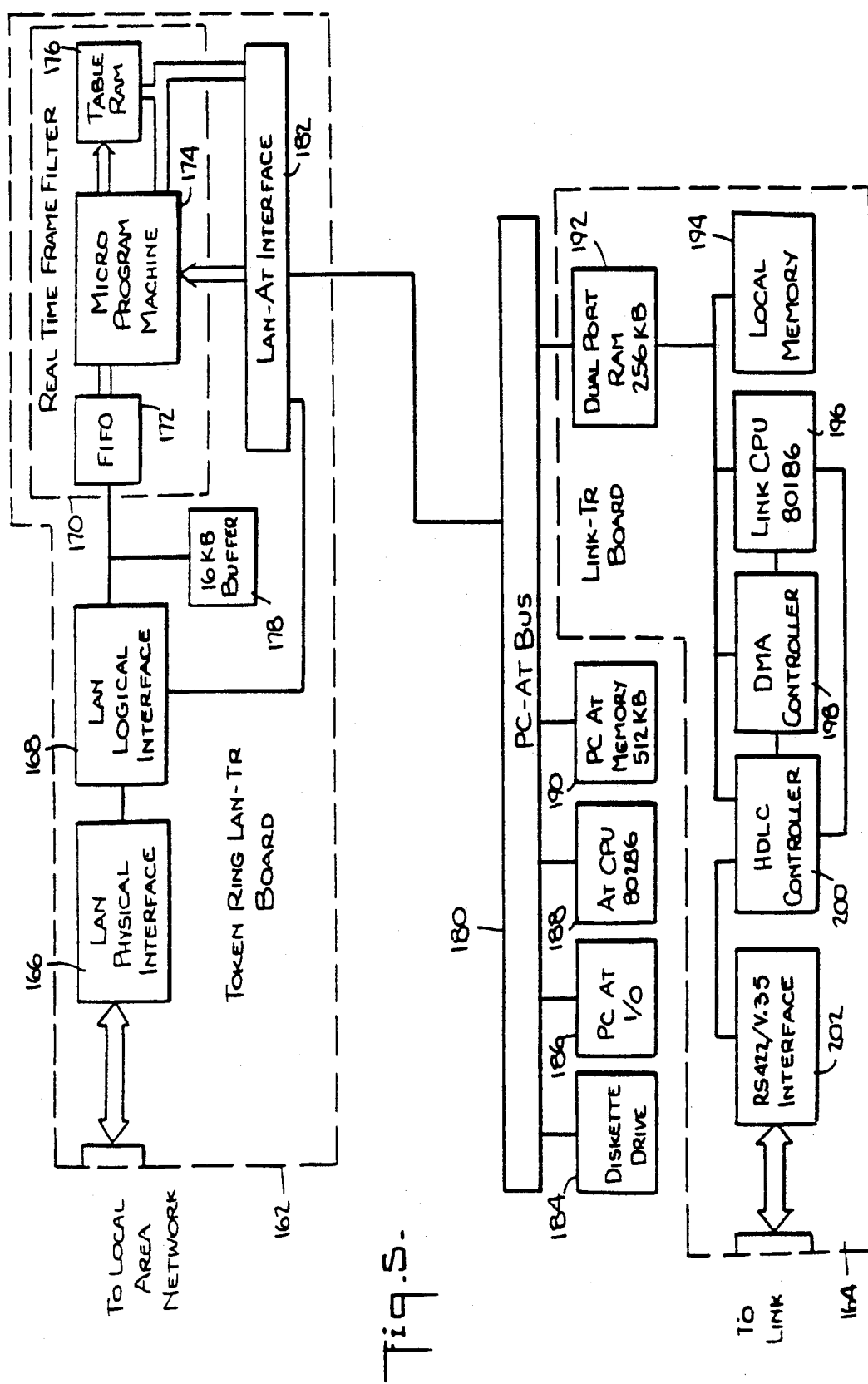
FIG. 5 is a block diagram illustrating a typical bridge constructed in accordance with the invention for interconnecting LANs.

FIG. 5 is a block diagram illustrating a typical bridge 160 for implementing the invention. Bridge 160 interconnects a token ring local area network with the communication system wide area network. Other bridge configurations are possible as would be understood by a worker skilled in the art. Bridge 160 can be used to connect local area networks in the configuration illustrated in FIG. 4.

Bridge 160 includes a token ring LAN TR board 162 which physically and logically connects the token ring LAN and the system bus of the bridge/brouter and a link token ring board 164 which is the physical and logical interface between the wide area network links and the system bus. The main functions of board 162 are: (1) receiving, transmitting, and copying of frames from and onto the token ring; (2) participating in MAC-layer tasks and functions as defined by IEEE 802.5; (3) filtering all frames over the token ring, using their destination address as the criteria; (4) forwarding onto the system bus the frames that have destination addresses outside the token ring LAN; (5) transmitting onto the token ring LAN frames that are forwarded from other LANs through the system bus; and (6) building, handling, and maintaining the Table of Addresses of the participant nodes of the token ring LAN. The main functions of board 164 are: (1) receiving and transmitting frames from or to the wide area network links; (2) receiving and forwarding frames from or to the system bus; and (3) finding the routing direction for each specific frame through the wide area network links, including checking, calculating and inserting the source routing fields of the packets that use source routing.

Board 162 includes the LAN physical interface 166 and the LAN logical interface 168, which are a TMS 380 chip set manufactured by Texas Instrument, Inc. for 4 Mbps token rings or for 4/16 Mbps token rings, or an equivalent chip set. This chip set implements IEEE 802.5 for token ring LAN, as is well known. Real-time filter 170 is a random logic group of chips centered around an EPLD chip (e.g., XILINX 2018 or equivalent). It implements the filtering and forwarding process and is programmed in accordance with the invention to determine whether a transparent or source routing method is to be used for each frame. The real time filter, 170, includes a FIFO 172, which is a small buffer consisting of data registers to store the header of the frames (MAC addresses, routing field, source routing bit) and a microprogram state machine 174 which is a finite state machine implemented by downloaded programmed microcode. It checks, in real time, the MAC addresses, the source routing bit and the routing field (if available) and compares that to the addresses in the table RAM 176. Based upon that comparison, the decision is made to use source or transparent routing and the packet is processed accordingly. The table RAM 176 is a RAM memory which implements the table it builds and stores and maintains the MAC addresses of the token ring LAN. The software to implement the invention is conventional once the invention is understood and therefore it is unnecessary to provide any further description of the software.

The 16 KB buffer, 178, is a dynamic RAM memory used to store frames and to transfer frames from or to the system (PC-AT) bus, 180. It also stores the LAN table of the MAC layer addresses of the token ring LAN. The LAN AT interface, 182, is a group of standard random logic chips that implement the bus and control the interface between the system bus, 180, the LAN logical interface, 168, and the real time frame filter, 170. System bus 180 is typically coupled to a diskette drive 184, PC AT I/O, 186, AT CPU 80286, 188, PC AT Memory 190, and link-TR board 164 via dual-port RAM 192.

Dual port RAM 192 is a 256 KB buffer memory used to buffer peak overflow of the data stream between links and the token ring LAN. Local memory 194 is an EPROM based memory used to store a small part of the software needed to load most of the software from disk. Link-CPU-80186, 196, is the token ring link board processor responsible for controlling the main processes of board 164. It is based on an Intel 80186 chip or the equivalent. The DMA controller, 198, is an Intel 8237 chip or the equivalent, which is used to control the direct memory access (DMA) process of data and to control information over the internal bus of the board 164 between HDLC controller 200 and the dual-port RAM 192. HDLC controller, 200, is the Rockwell 68561 chip or equivalent which is responsible for the physical receiving and transmitting of frames over the wide area network links from and to similar devices in other remote bridges and brouters. The RS 422-V.35 interface 202 translates the digital logical bits onto the physical media using either V.35 or RS 422 standard electrical interfaces.

Those skilled in the art will understand that the bridge shown in FIG. 5 is but one example of a bridge implementing the invention and that the configuration and construction of the various elements of the bridge uses hardware and software well known to those skilled in the art. Described herein are presently preferred embodiments of the invention. Those skilled in the art will recognize that many modifications and changes can be made to the particular embodiments which have been described without departing from the spirit and scope of the invention which is set forth in the appended claims.

What I claim is:

1. A bridging device adapted to be interconnected to a local area network having at least one source routing node connected thereto and to other bridging devices by one or more non-LAN interconnecting communications links to interconnect local area networks into a communication system in which information is transmitted from a source node in a first local area network via a bridging device, non-LAN communications link and bridging device to a source node in a second local area network comprising means adapted to receive an information packet including data defining a routing field emanating from a source routing node connected to said first local area network, said information packet including destination data and means for appending the data in the routing field to emulate a bridging device—local area network—bridging device routing path over the non-LAN communications links interconnecting the bridging devices for routing the information to the proper source node in said second local area network.

2. A communication system comprising at least two local area networks including a first bridge connected to the first local area network and a second bridge connected to the second local area network, at least one non-LAN communications link interconnecting said at least first and second bridges in the communication system such that communication is effected by transmitting information from the first local area network to first bridge then over the non-LAN communication link to said second bridge to said second local area network, at least one source routing node coupled to at least said first and second local area networks, each of said bridges including means for receiving information including a routing field for transmission from a source routing node connected to said first local area network to a source node connected to said second local area network, and means responsive to said receiving means for inserting data in said routing field to emulate a bridge—local area network—bridge routing path for transmission of the information over said at least one non-LAN communication link interconnecting said first and second bridges.

3. The communication system of claim 2 further including multiple non-LAN communications links interconnecting said first and second bridges and said responsive means for inserting data in said routing field to define the particular non-LAN communications link between the two bridges over which data flows.

4. A communications system comprising multiple local area networks, a bridging device coupled to each of said local area networks and non-LAN communication links coupled between at least two of said bridges such that information transmitted from a first local area network passes through a bridging device and at least one non-LAN communication link to a second bridging device and to a second local area network, at least one source routing node coupled to each of at least two local area networks comprising the communication system, said bridging device including means for receiving information to be transmitted from a first source routing node on said first local area network to a second source node on said second local area network, said information including routing information, and means in said bridging device for modifying said routing information to insert a virtual LAN number representative of the non-LAN communication links between bridges over which the information is to be transmitted to effect transmission of information between said first and second source nodes.

5. A method for communicating information between at least first and second local area networks including a first bridge connected to said first local area network and a second bridge connected to said second local area network and at least one non-LAN communications link interconnecting said first and second bridges in the communication system, at least one first and one second source routing node coupled to said first and second local area networks respectively such that information communicated between said source nodes is transmitted from said first source node via said first bridge, and a non-LAN communication link to said second bridge to said second local area network and to said second source node, said method comprising the steps of receiving in said first bridge information including a routing field for transmission from said first source routing node connected to said first local area network to said second source node connected to said second local area network, and inserting data in said routing field to emulate a bridge—local area network—bridge routing path for transmission of the information over at least one non-LAN communications link interconnecting said first and second bridges.

* * * * *

UNITED STATES PATENT AND TRADEMARK OFFICE
CERTIFICATE OF CORRECTION

PATENT NO. : 5,214,646
DATED : May 25, 1993
INVENTOR(S) : Amnon Yacoby

It is certified that error appears in the above-identified patent and that said Letters Patent is hereby corrected as shown below: ON THE TITLE PAGE:

Assignee [73]: RAD Network Devices Ltd.
Tel Aviv, Israel

RAD Network Devices Inc.
Huntington Beach, California

Signed and Sealed this

Twenty-first Day of March, 1995

Attest:

BRUCE LEHMAN

Attesting Officer

Commissioner of Patents and Trademarks